Sept. 4, 1934.  A. O. OLAFSON  1,972,534
VEHICLE ACTUATED SWITCH
Filed Aug. 3, 1931    2 Sheets-Sheet 1

Inventor
Alvin O. Olafson
By Howard Fischer
Attorney

Patented Sept. 4, 1934

1,972,534

UNITED STATES PATENT OFFICE 1,972,534

VEHICLE ACTUATED SWITCH

Alvin O. Olafson, St. Paul, Minn., assignor to National Traffic Signal Company, St. Paul, Minn., a corporation of Minnesota Application August 3, 1931, Serial No. 554,629

17 Claims. (Cl. 200—86)

This invention relates to an improvement in vehicle detectors for use in combination with traffic control signals and other devices where it is desired to close a contact in an electrical circuit when a vehicle passes over the detector.

It is often desirable to operate traffic control signals by the approach of a vehicle toward the signals. This operation provides a means of automatically regulating the signals to adjust them to the flow of traffic. In order to accomplish this aim, a means of detecting vehicles approaching the signals must be provided. I accomplish this result in a novel and satisfactory manner.

It is my object to provide a vehicle detector which will operate to close a contact in an electrical circuit when a car passes over my detector in a direction toward the signals. My detector is adapted to be embedded directly in the roadway, in position to be driven over by a vehicle approaching the intersection at which the signal or signals is situated. This detector is of sufficient length to prevent a car from straddling the same without touching the detector, and is set at a distance from the curb on the right of the road approaching the intersection so that no car could pass between the detector and the curb without crossing the detector. For extremely wide roads, two detectors may be used, spaced just sufficiently apart longitudinally to prevent a car from passing between the two without crossing one or the other of the detectors.

It is an object of my invention to construct my detector in such a manner that the electrical contact will be closed only by cars coming toward the intersection. Accordingly, cars traveling away from the intersection which pass over the detector will not operate the traffic signal or signals at the intersection.

It is a feature of my detector that while cars traveling away from the intersection passing over my detector will not operate to close the signal circuit, a car simultaneously traveling over my detector in a direction toward the intersection will act to control the signal. This is an extremely important feature, as it insures the correct and unerring operation of the signal at all times when necessary, but prevents unnecessary changing of the signal.

My detector is of an extremely simple nature, having only a few parts and will not readily get out of order. It is extremely sensitive to the direction of travel of traffic so that traffic moving in one direction will operate the detector to close an electric circuit, while traffic traveling in the other direction will not effect the closing of the circuit nor will traffic traveling in both directions at the same time over the detector, cause the same to fail to indicate the movement of traffic which should be recorded by the detector. Thus by means very simple and yet highly sensitive to the movement of traffic, I provide a detector having an unfailing efficiency, requiring little or no attention after the same has been installed, either for the operation of controlling signals, or other mechanism as may be desired.

My detector may be made in sections which can be placed in the highway or road, so that vehicles will travel over the same and the working parts are protected by a flexible or resilient covering blanket made of rubber of other suitable material which seals these parts to prevent moisture and dirt from effecting their proper operation. As many sections as may be desired may be positioned beneath the sealing blanket so that longer or shorter sections may be employed. This permits the detector to be placed in the roadway or in the street so that vehicles must pass over it before coming to an intersection, and thus the travel of the vehicles operates the detector.

These objects, together with other novel features of my invention and a detailed description of the construction and operation thereof, will be more clearly and fully set forth in the following specification and claims.

In the drawings forming a part of my specification:

Figure 1:
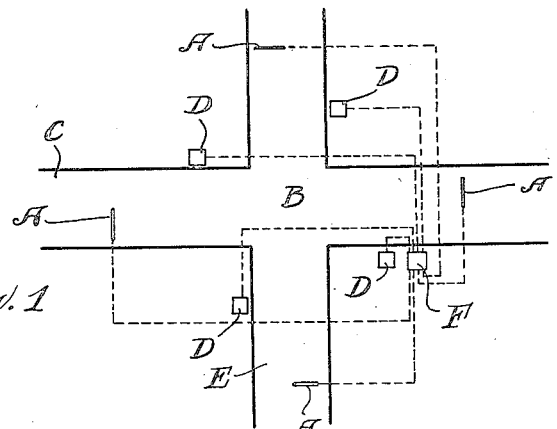
Figure 1 is a diagrammatic view of a street intersection provided with corner traffic control signals, illustrating the positioning of the street contacts embodied in my detector.

My vehicle detectors A are adapted to be embedded in the roadway at a short distance back from the intersection B. A vehicle passing over one of the detectors A on the street C will act to change the signals D to provide a right of way on the street C; and a vehicle passing over one of the contacts on the street E will act to change the signals D back after the desired interval to display a "go" signal on the street E. The signals D are ordinarily controlled directly through a suitable timer F, which is connected between the detectors and the signals D, and which provides suitable intervals of time between signal changes and compensates for irregularities of traffic.

My vehicle detector A is illustrated embedded in the pavement 10 of the roadway. The body portion 11 of the detector 10 comprises a flat bottom plate 12 provided with side flanges 13 adapted to extend up flush with the surface of the roadway. The bottom plate 12 is held in position in the pavement by means of suitable anchoring bolts 14 extending through the bottom 12 down into the pavement 10.

At intervals throughout the length of the detector A rectangular hollow boxes 15 project downwardly from the bottom plate 12. The boxes 15 provide pockets for containing the contact switches G which act to close the circuit to the signal timer F when operated by a vehicle. A large part of each pocket opening is covered by the cover plates 21 which are set in place after the switch G is placed in the pocket.

Opposed spring plates 16 are secured to the top of the bottom plate 12 by means of bolts 17. The plates 16 are normally flat against the bottom plate 12 along the side thereof containing the connecting bolts 17, but are so shaped as to spring upwardly along the free edge 18 to hold itself by the resiliency of the material itself spaced from the surface of the bottom 12. The opposed plates 16 are secured along their outer edges, and the free edges 18 are spaced slightly from each other and from the bottom member 12. When depressed, the plates 16 rest upon the bottom plate 12. The spacing of the edges 18 from the bottom member 12 is regulated and limited by means of the bolts 19, which are spaced at intervals throughout the length of the detector A. The bolts 19 are each secured to one of the plates 16 and extend down into an aperture formed in the body portion 11 of the detector A for that purpose. The bolts 19 when in operative position, are so arranged that the heads 20 of the same strike shoulders 22 formed in the apertures 23 as the plates 16 flex away from the bottom member 12 to limit the movement.

If it is found desirable, suitable spring means may be used in order to space the edge 18 from the bottom plate 12. In actual practice, however, the resiliency of the spring plates 16 has proven sufficient to raise all but the fixed edge of the plates from the bottom member 12.

Figure 2:
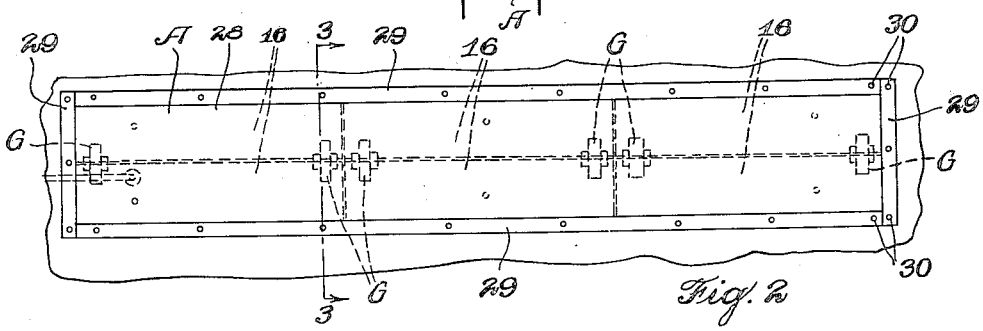
Figure 2 is a plan view of one of my detector units, illustrating the position of the electrical contacts.

Rather than provide a single pair of spring plates 16 extending throughout the length of the detector A, I provide a series of pairs secured end to end, as illustrated in Figure 2 of the drawings. These pairs of plates 16 are separated just sufficiently to provide clearance between the various pairs. This construction is for the purpose of assuring a contact to operate the traffic signals D when two vehicles are passing over the detector in opposite directions in a manner which will be hereinafter more clearly pointed out.

As has been described, the switches G are positioned in pockets formed at intervals along the length of the detector. In preferred form, a pair of contact switches G are provided for each pair of spring plates 16, one contact being placed near each end of each of the pairs, as illustrated in Figure 2 of the drawings. The number of contact switches G necessary depends upon the length and nature of the spring plates 16, and may be regulated to suit the conditions.

The contact switches G are constructed with a yoke shaped frame 24 having opposed outwardly extending attaching flanges 25 by means of which the yoke frame 24 may be attached to the bottom plate 12. When secured in position, the frame 24 is suspended down into the pockets formed by the hollow boxes 15.

Between the spaced sides of the yoke frame 24, I mount a peculiarly shaped flat spring 26, coiled in the manner illustrated in the drawings. The spring 26 is pivotally supported upon a pivoting pin 27 extending through the sides of the frame 24. As may be seen, the top of the spring 26 rests against or adjacent the opposed free edges 18 of the plates 16. When the plates 16 are forced downwardly, one at a time, these plates 16 depress and deform the spring 26 in a manner which will be more clearly described.

The plates 16, and the bottom plate 12 is covered by means of a resilient blanket 28 formed of rubber or other suitable material. This blanket 28 is held in place by means of metal edge strips 29 adjacent the side flanges 13, which edge strips 29 clamp the blanket 28 firmly between the bottom plate 12 and the strips 29. Bolts 30 tighten the strips 29 over the edges of the blanket 28. Pressure exerted downwardly upon the blanket 28 is transmitted through to the plates 16. A vehicle wheel passes over one of the edge strips 29 and on to the blanket 28. The plate 16 on the side of the detector which is first contacted will be depressed before the plate on the other side, a natural consequence in the progress of the vehicle. As the wheel passes over the central portion of the detector, both plates will be depressed.

Metal contact strips 32 of a resilient, spring-like nature are secured at one end to the bottom member of the yoke frame 24 through suitable insulation. The central portion of the bottom 33 of the yoke is cut away to permit the strips 32 to bend down through the bottom 33 from the point of connection. Blocks 34 of insulation are secured to the end of the frame bottom 33 opposite the end at which the strips 32 are connected, and serve as stops to restrict the upward movement of the strips 32. The downward movement is not limited by stops, but the plates 16 can only depress down flat against the bottom plate 12, so that the downward movement of the spring 26 is limited in this manner.

Figure 3:
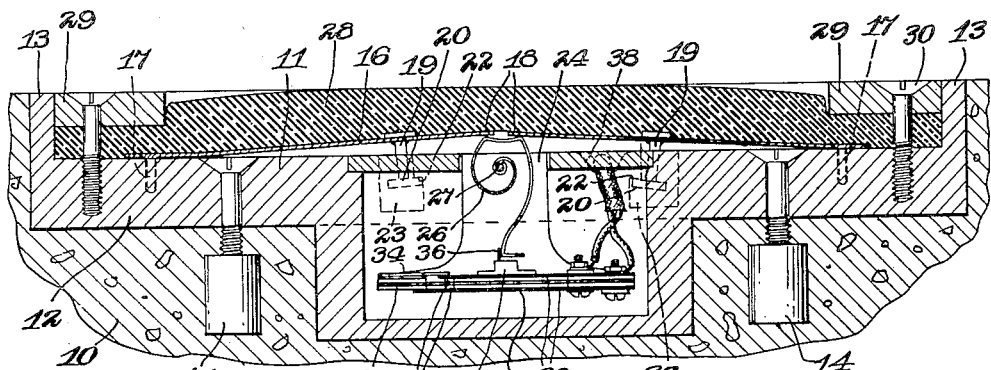
Figure 3 is a section on the lines 3—3 of Figure 2, illustrating the position of the electrical contacts and actuating means when no vehicle is passing over the detector.
Figure 4:
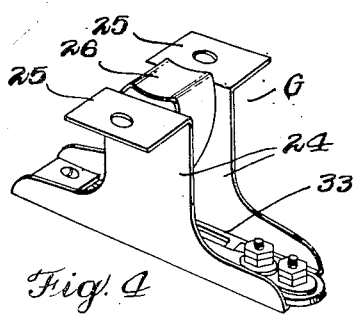
Figure 4 is a perspective detail view of one of the electrical contacts used in my detector.

The contact strips 32 are normally spaced apart sufficiently to prevent arcing, and to break the circuit therethrough. An insulation block 35 is mounted upon the upper contact strip 32, and a small pin 36 projects upwardly at one side of the block 35. The free end of the spring 26 is normally positioned directly above this block 35, in the position illustrated in Figure 3 of the drawings.

In the operation of the detector, each strip 32 is connected electrically with the circuit to the signal timer F, in such a manner that contact between the points 37 on the strips 32 will close the circuit. The detector and switch G are normally in the position illustrated in Figure 3, when no vehicles are passing over the blanket 28. In the drawings, Figures 3, 5, and 6, the left side of the section is nearest the intersection.

Figure 5:
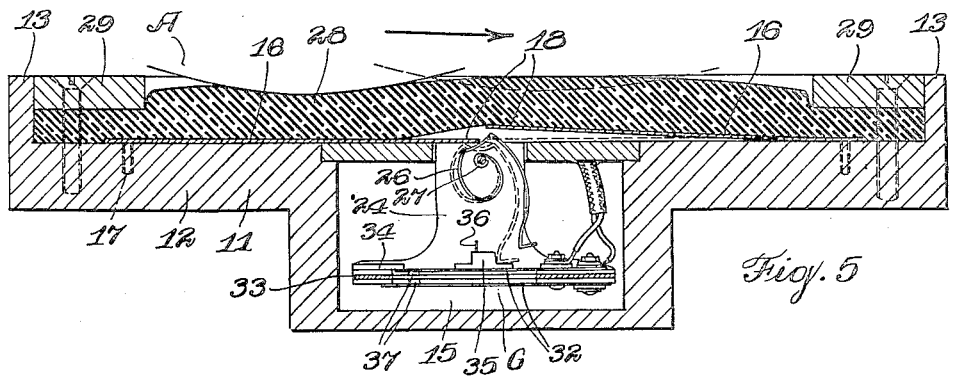
Figure 5 is a cross-sectional view similar to Figure 3, showing the position of the electrical contacts and actuating means when a vehicle traveling away from the intersection passes over my detector.

When a vehicle traveling away from the intersection happens to pass over the detector, in the direction illustrated by the arrow in Figure 5 of the drawings, the spring 26, which is slightly concaved at the top to provide a bearing point for the spring against each of the plates 16, is deformed into the position illustrated by the full lines in this figure. The plate 16 on the left is first depressed, forcing down the left side of the spring 26. The free end of the spring is swung considerably to the right of the insulation block 35. As the vehicle travels to the right, the wheel coming into the position illustrated by the dotted lines in Figure 5, the plate 16 at the right is sprung downwardly. This causes the spring 26 to move back into the position illustrated by the dotted outline. It will be noted that the free end of the spring 26 bears against the side of the block 35, and that even when both of the plates 16 are down, the spring 26 cannot force the upper contact strip 32 down into contact with the lower strip. When the vehicle passes the detector A, the spring 26 and plates 16 again assume the position illustrated in Figure 3 of the drawings.

Figure 6:
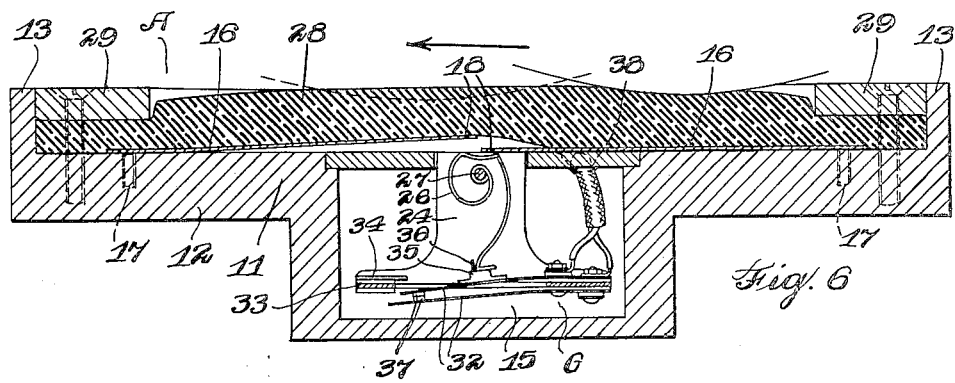
Figure 6 is a cross-sectional view similar to Figure 5, illustrating the position of the contacts and actuating means when a vehicle traveling toward the intersection passes over my detector.

When a vehicle traveling in the direction of the intersection passes over the detector, in the manner illustrated in Figure 6 of the drawings, the plates 16 on the right side of the detector is depressed first. This plate 16 bears against the right side of the spring 26, tending to swing the free end of the spring 26 to the right. This is impossible, as the pin 36 limits the swing of the spring end in this direction. Accordingly, the spring 26 is depressed straight downwardly, forcing downward the contact strips 32 and bringing the contact points 37 together, closing the circuit through the same. When the vehicle wheel travels into the position illustrated by the dotted lines in Figure 6, the spring plate 16 on the left side of the detector is depressed, but the plates being on a level plane bear against the spring top evenly, and the contact is unchanged until the vehicle passes over the detector, at which time the switch G returns to the position illustrated in Figure 3 of the drawings.

Accordingly, when a car comes toward the intersection, a contact is made by the switch G which closes a circuit to the timer F, causing the signals D to display a "go" signal for the vehicle operating the switch G. When a car passes in the other direction, however, the free end of the spring 26 is swung to one side and depressed, striking the side of the insulation block 35 rather than bearing down on the top of the same. Thus the contact through the contact strips 32 is not made, and the signals D are not affected.

As the detector A is composed of several sections, or is made up of several pairs of spring plates 16, a vehicle passing over the same would only effect the particular section over which it passed. For example, a car passing over the end pair of spring plates 16 would not depress the central pair of plates 16, or the plates 16 at the other end of the detector A. Thus, if cars traveling in opposite directions pass over the detector simultaneously, the one approaching the intersection would make the contact to close the circuit, while the other one would not. The operation of each vehicle is independent of the other. This is a very important feature.

Figure 7:
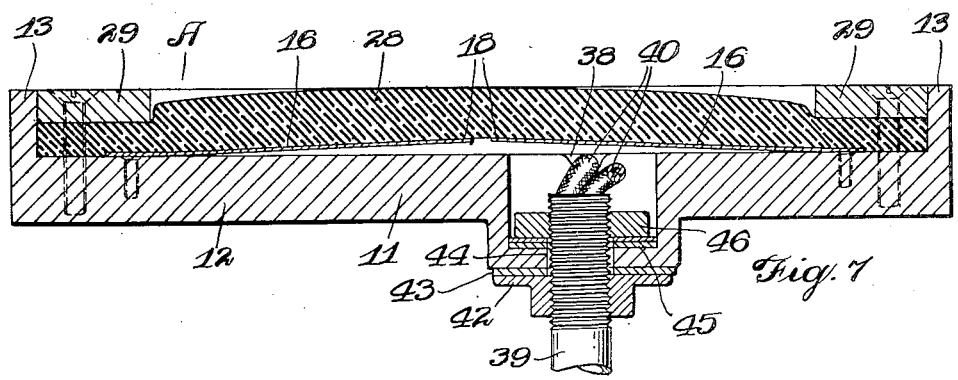
Figure 7 is a cross-sectional view on the line 7—7 of Figure 2, illustrating the manner in which the electrical cable conduit is connected to the detector.

The wires for the electrical circuit pass from one switch G to another through a groove 38 in the bottom plate 12. In order that no moisture enter the body portion 11 of the detector A around the electrical wiring outlet, the conduit 39 containing the wires 40 is threaded at one end, and equipped with a flange 42 before the body portion 11 is placed in position in the pavement. A gasket 43 is placed on the top of the flange 42, and the end of the conduit 39 extends through a hole 44 in the bottom of the detector A, as illustrated in Figure 7 of the drawings. Another gasket 45 and a nut 46 is threaded upon the extending end of the conduit 39, clamping the bottom of the detector between the two gaskets. Virtually no moisture is allowed to seep into the detector in this manner.

Throughout the entire construction, care has been taken to prevent entrance of moisture to cause short circuit or rusting of the parts. The bottom of the body portion 11 is entirely closed except for the conduit connection, which is sealed securely. The blanket covering the entire top is clamped rigidly at either edge and at each end, no moisture can enter in this manner.

Throughout the specification, particular attention has been directed to the use of the detector as associated with traffic signals. Various other uses are also possible, such as use for opening or closing garage doors automatically or the like. Other modifications of circuit systems beside that described could also be used. For example, if desired, the contact strips 32 could easily be arranged so that a continuous circuit would remain closed at all times until one of the strips were depressed, at which time the circuit would be broken. It is believed, however, that such modifications are obvious, and need not necessarily be shown.

In accordance with the patent statutes, I have described the principles of operation of my vehicle detector, and while I have endeavored to set forth the best embodiment thereof, I desire to have it understood that this is only illustrative of a means of carrying out my invention, and that obvious changes can be made within the scope of the following claims without departing from the spirit of the invention.

I claim:

1. A vehicle operated switch including, means for closing an electric circuit when a vehicle travels over said detector in one direction, and means for preventing the closing of the circuit when the vehicle travels in the opposite direction, said last named means including a single pivoted spring member, pivoted in a manner to become active for closing the circuit when pressed on one side and inactive when pressed on the other side.

2. A vehicle actuated switch including, a pair of depressible plates having freely disposed meeting edges spaced apart in raised or depressed position, spring means for holding the free edges of each of said plates normally elevated, an electric switch operated by said spring means to close a circuit and means on said spring engageable by one of said plates to move said spring out of switch operating position when said plate is depressed prior to the depression of the other plate.

3. A vehicle operated switch including, a pair of normally spaced contacts, spring means in operable engagement with said contacts for closing said contacts in a circuit to operate a traffic signal by the travel of vehicle wheels over said switch in one direction, and means for moving said circuit closing means into inoperative position by traffic wheels traveling in the other direction over said switch.

4. An electrical vehicle actuated switch including, a circuit closing switch embedded in the surface of the highway, a flexible moisture-proof covering for said switch, spring means for operating said switch, means operating said spring means, to close a circuit by vehicle wheels traveling over said flexible covering in one direction, and means for moving said spring means out of operative position when the vehicle wheels travel in the opposite direction over said covering.

5. A vehicle actuated switch including, a switch element adapted to be embedded in the roadway over which the vehicles must travel toward intersections, said element including a unit comprising a pair of electric contacts normally spaced apart to operate an electric circuit by the closing thereof, said unit being controlled by a spring element pivotally supported above said unit, with an operating arm extending toward and adapted to engage said unit to operate the same, said spring element including means for shifting automatically into or out of operating position controlled by the direction of travel of traffic over the same.

6. A vehicle actuated switch for indicating the movement of traffic including, an electrical switch unit, a pair of contact members insulated and spaced from each other, a spring member for operating said switch unit to close said contacts, means for pivotally supporting said spring member to swing out of switch operating position, and spaced operating plates separably depressible against said spring member so that when one of said plates is depressed against said spring member previous to the depression of the other plate, said switch elements will contact to close a circuit, and means on said spring member operable when said other plate is first depressed to move said spring into inoperative position and to prevent the closing of said contacts.

7. A pressure operated vehicle actuated switch including, a pivotally mounted spring member, an operating arm depending from said spring member, an electric switch adapted to be operated by said arm to close an electric circuit, operating plates carried above said spring member having their free edges resting thereon and spaced apart to provide a meeting edge when both of said plates are depressed, shoulders formed on said spring member against which said plates rest, one of said shoulders engageable with one of said plates to pivot said spring when said one plate is depressed previous to the other, a flexible sealing blanket over said plates and means for holding said spring against pivoting when the other of said shoulders is engaged by the depression of said other plate previous to the depression of said one plate.

8. A pressure operated vehicle actuated switch including, a flexible sealing blanket, an electrical switch mounted below said blanket, for closing an electric circuit, an element for actuating said switch, means operable by traffic travelling in one direction over said blanket for operating said element, and means operable by traffic travelling in the other direction to render said element inoperative, said traffic operated means movable into alignment to provide a flat continuous upper surface beneath the sealing blanket when depressed by traffic in either direction.

9. A vehicle actuated switch for controlling traffic including, a unit provided with an electrical circuit closing switch, a flexible blanket for covering said unit, switch operating means allowing said blanket to be depressed virtually flat by vehicle wheels traveling over the same, said switch operating means including a member swingably mounted to move away from said switch unit when one side of said member is first depressed preventing the closing of said switch units, and means for holding said member against pivoting when the other side of said member is first depressed to close said switch when traffic travels over said blanket in the opposite direction.

10. A vehicle actuated switch for indicating the movement of traffic including, an electrical switch unit, depressible plates for operating said unit, spring means for holding said plates elevated at their free ends, an electrical switch associated with said spring means, means for pivotally supporting said spring means, shoulder means formed on said spring means against which the free edges of said plates rest, shoulder means formed on said electrical switch adapted to receive the free end of said spring means, a flexible sealing blanket over said operating plates, the depression of one of said plates first causing said spring means to engage said shoulder means on said switch to operate said switch to close an electric circuit, the depression of the other of said plates first throwing said spring means out of switch operating position to prevent the closing of said switch.

11. An electrical circuit operating switch unit including, a pair of switch arms having contacts normally spaced apart and insulated from each other, a spring arm for operating said switch arms to close said switch to form an electric circuit having a depending operating foot, means for pivotally mounting said spring arm to cause said foot to swing into and out of operating position, a shoulder carried by one of said switch arms against which said foot is adapted to engage when swung and depressed in one direction, said foot swinging out of operating poistion when moved away from said shoulder, and shoulder portions formed on said spring arm adapted to control the operation of said spring arm by pressure operating thereagainst.

12. An electric switch unit for a pressure operated vehicle detector including, a pair of spring switch arms, contacts spaced apart on the free ends thereof, a spring member having a spring loop pivotally mounted above said switch arms, oppositely disposed shoulders formed in said spring loop of said member, a spring foot depending from said loop and shoulders, a shoulder carried by one of said switch arms against which said foot engages when it is swung in one direction by pressure on one of said shoulders formed in said loop, said foot swinging away from said loop when pressure is exerted against the other of said shoulders formed in said loop to provide a circuit closing unit which is operating to close a circuit by a vehicle passing over the same in one direction, and to be inoperative by the traffic passing over the same in the other direction.

13. A vehicle detector electrical switch including, a pair of switch arms and a single spring arm pivotally mounted in relation to said switch arms to operate said switch arms, means for transmitting exerted pressure to one side of said spring arm to operate said switch arms, and means for transmitting pressure to the other side of said spring arm to move said arm out of operating position.

14. A vehicle operated switch including, a pair of contacts, a spring loop pivotally mounted over said contacts, means operable to transmit pressure downward on one side of said loop to close said contacts, and means operable to transmit downward pressure on the other side of said loop to swing the same free of said contacts.

15. A vehicle operated switch including, a pair of contacts, a spring member pivoted adjacent said contacts, means for transmitting pressure to one portion of said spring to close said contacts, means for transmitting pressure to another portion of said spring member to pivot said spring member away from said contacts.

16. A vehicle actuated switch including, a fixed pivot, a pair of contacts adjacent said pivot normally spaced apart, a contact operating member in operable engagement with said contacts and mounted on said pivot, shoulders thereupon, the traffic in one direction depressing one shoulder first, pivoting said operating member to close said contacts, traffic in the other direction depressing the other shoulder first, pivoting said operating member to inoperative position.

17. A vehicle actuated switch including, a pair of contacts normally spaced apart, a spring mounted above said contacts, means on said spring operable by traffic in one direction to close said contacts, means on said spring operable by traffic in the opposite direction to move said spring out of operative position.

ALVIN O. OLAFSON.